(12) United States Patent
Shaikh et al.

(10) Patent No.: US 11,205,138 B2
(45) Date of Patent: Dec. 21, 2021

(54) MODEL QUALITY AND RELATED MODELS USING PROVENANCE DATA

(71) Applicant: INTERNATIONAL BUSINESS MACHINES CORPORATION, Armonk, NY (US)

(72) Inventors: Samiulla Zakir Hussain Shaikh, Bangalore (IN); Himanshu Gupta, New Delhi (IN); Rajmohan Chandrahasan, Kanchipuram (IN); Sameep Mehta, New Delhi (IN); Manish Anand Bhide, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 16/419,116

(22) Filed: May 22, 2019

(65) Prior Publication Data
US 2020/0372398 A1 Nov. 26, 2020

(51) Int. Cl.
*G06N 20/00* (2019.01)

(52) U.S. Cl.
CPC .................................... *G06N 20/00* (2019.01)

(58) Field of Classification Search
CPC ......... G06N 20/00; G06N 7/005; G06N 5/022
See application file for complete search history.

(56) References Cited

U.S. PATENT DOCUMENTS

| 10,521,719 | B1* | 12/2019 | Walters ................ G06F 21/60 |
| 10,719,301 | B1* | 7/2020 | Dasgupta ................ G06F 8/33 |
| 10,817,791 | B1* | 10/2020 | Shoemaker ........... G06F 21/316 |
| 2002/0164070 | A1 | 11/2002 | Kuhner |
| 2008/0077544 | A1 | 3/2008 | Sureka |
| 2013/0073490 | A1 | 3/2013 | Baughman |
| 2016/0055426 | A1 | 2/2016 | Aminzadeh |
| 2016/0300156 | A1 | 10/2016 | Bowers |
| 2018/0075354 | A1 | 3/2018 | Averboch |
| 2018/0129959 | A1 | 5/2018 | Gustafson |
| 2019/0130285 | A1* | 5/2019 | Snyder ................ G06N 5/022 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Eric J Yoon
(74) *Attorney, Agent, or Firm* — Caleb D. Wilkes (57) ABSTRACT

A method, computer system, and a computer program product for utilizing provenance data to improve machine learning is provided. Embodiments of the present invention may include collecting provenance data. Embodiments of the present invention may include identifying model quality improvements based on the collected provenance data. Embodiments of the present invention may include identifying related models based on the collected provenance data. Embodiments of the present invention may include recommending model quality improvements to a user.

19 Claims, 6 Drawing Sheets

MODEL QUALITY AND RELATED MODELS USING PROVENANCE DATA

BACKGROUND

The present invention relates generally to the field of computing, and more particularly to machine learning. Machine learning tasks, such as training a model or classifying a test dataset, may be performed on cloud-based artificial intelligence or machine learning platforms. The cloud-based machine learning platforms may offer a large choice of datasets, algorithms and infrastructures to quickly perform machine learning tasks. A user may find difficulty in determining how to train a machine learning model with the multiple machine learning tasks available and the multiple available platforms.

SUMMARY

Embodiments of the present invention disclose a method, computer system, and a computer program product for utilizing provenance data to improve machine learning. Embodiments of the present invention may include collecting provenance data. Embodiments of the present invention may include identifying model quality improvements based on the collected provenance data. Embodiments of the present invention may include identifying related models based on the collected provenance data. Embodiments of the present invention may include recommending model quality improvements to a user.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, machine learning (ML) tasks, such as training a model or classifying a test dataset, may be performed on cloud-based ML platforms. A typical ML process may begin with a raw dataset that gets reduced into a refined dataset. The refined dataset is processed by a training algorithm and then is processed by a trained model to provide a predictive output. The ML community is growing at a rapid pace and is migrating to cloud-based platforms, therefore, providing a large number of trained ML models to be chosen from a substantial library or catalog of models is now accessible to users. The cloud-based artificial intelligence (AI) or ML platforms may host a large number of datasets, training datasets, algorithms and infrastructures to quickly perform ML tasks and to train and deploy ML models. A user may find difficulty in determining how to train a ML model with the multitude of available ML tasks and platforms.

Therefore, it may be advantageous to, among other things, assist a user by providing one or more suggestions of models that relate to the needs or requirements of the user. Additionally, suggestions may also be provided to a user that include recommendations for improving the model quality. Improving user experiences may be accomplished by quickly identifying the capabilities of available models that best align with the user's needs.

The following described exemplary embodiments provide a system, method and program product for providing ML dataset and model recommendations to a user to improve model quality and to identity related models. As such, embodiments of the present invention have the capacity to improve the technical field of ML by exploiting data lineage to recommend an improvement to the model quality. The model quality improvement recommendations may include refined or accurate datasets, data transformations and model parameters to a user training a new model or to a user accessing an existing model. Additionally, embodiments of the present invention may suggest related models to a user based on a user's chosen model, model and dataset content, model access patterns, data profiles, user profiles and provenance data.

According to an embodiment, data lineage may be used to track ML platform events. Data lineage may also be known as provenance data. A ML platform event may include information relating to how datasets have been cleaned and curated, may include how various ML models have been trained and used or may include feedback received on datasets and models. Provenance data may provide information beginning with the origin of the data and how the data changes over time or over a time period. Provenance data may be collected, for example, via metadata, a global positioning system (GPS), a sensor, an internet of things (IoT) device, a smart phone, a smart watch, a smart tablet or a computing device. The collected provenance data may be related to one or more users, one or more models or one or more datasets. The collected provenance data may include data origins, data characteristics, data relationships, data transformations or data movements. A data lineage service may be used to access and collect the provenance data.

According to an embodiment, model lineage may also be considered when tracking ML platform events. For example, capturing and analyzing model lineage may provide information relating to how a model specification has evolved or is evolving over a time period, which sets of users contributed to the development of the model since the inception of the model, what kind of users have been using the model definition, which datasets were used to train models using the model specification and which datasets were classified or cleaned using the model. Model lineage may include information collected based on the development of the model over time. Some model lineage information may overlap with data lineage, such as training and feedback on the model.

A user may train a new model or may access an existing model that may not perform to a standard that may be useful or optimal to the user. Suggestions may be provided to the user to improve the trained model quality. Improving model quality may occur by recommending accurate datasets, by recommending data transformations or by recommending model parameters. Suggestions may also be provided that offer related models or other alternative models that may be useful and accessible to the user. Related model suggestions may be based on the model context, the provenance data associated with the models and datasets, the access patterns, the data profiles or the user profiles.

Model context may provide information relating to the current state of the model, such as recent actions performed by the user, recent changes to the model, the current configuration (e.g., the dataset selected) and the operations performed on the recent data. Context may be considered, for example, the live state of the model and the user that plays a role in determining the related models used. For example, the live state of the model may be based on the current quality of the model per user feedback and the user role may include a user who chooses a dataset from the financial industry. The context may be a subset of the overall lineage data that may be significant in determining related models.

According to an embodiment, recommendations regarding model quality improvements or related models may be provided to a user via a message or an alert created and provided by a model quality program. The result of the model quality program analysis may be transmitted to the user in the form of a message or an alert on a user computing device that offers a suggestion, a recommendation, feedback or an output to a user. For example, a recommendation may be transmitted to the user in the form of an email message, a text message, a voice message, an alert or a pop-up message. For real-time data being collected and accessed, such as user related data transmitted to and received by an IoT device, a sensor, a GPS device or a smart watch, the model quality program may receive consent from a user, via an opt-in feature or an opt-out feature, prior to commencing—collecting data or the monitoring and analyzing of the collected data. For example, in some embodiments, the model quality program may notify the user when the collection of data begins via a graphical user interface (GUI) or a screen on a computing device. The user may be provided with a prompt or a notification to acknowledge an opt-in feature or an opt-out feature.

Provenance data related to a ML model may include model metrics, training and testing datasets, feature sets, a usage history, reviews, ratings, feedback, ML algorithms that were used, model metadata such as names, description tags and categories, and deployment metadata such as samples classified and an outcome provided. Feature sets may include sets of features that define the dataset and model input, such as a structured dataset associated with each record. For example, a structured dataset with columns in a structured document spreadsheet labeled as income and age. As users operate the model for various purposes, the users may share feedback in the form of ratings, reviews or likes, for example, the same way ratings, reviews and likes are shared on social media or ecommerce websites. The feedback offered from various users may provide information for discovering related models or similar models.

Tags or description tags and categories may provide useful data. Users may assign tags, such as custom tags, or categories, such as pre-defined categories, to the models. For example, a model trained on a dataset of bank customers, assigned tags may include loan and credit history and a category may include finance.

Provenance data relating to a dataset may include a usage history, a forward and backward lineage, transformations applied for data preparation and cleaning, column classifications, reviews, ratings, feedback, data distribution over classes and metadata such as names, descriptions, tags and categories. Forward lineage may capture how various parts of datasets evolve over time. Backward lineage may also capture how various parts of datasets evolve over time, however, in the reverse direction from forward lineage. For example, given an older dataset version, forward lineage may capture how a portion of the dataset changes over a time period forward in time and backward lineage may maintain reverse pointers that may assist in determining where a particular portion of data originated from.

Provenance data related to a user may include user preferences and a user access history. User preferences may be captured from past user activities based on the user choices and a determination may be made based on the user preferences. For example, a user preference obtained may include that a user prefers financial datasets over demographic datasets. The preferences may be determined, computed and stored on a ML cloud platform.

Provenance data may be analyzed to improve model quality by predicting the accuracy of a dataset or by predicting the accuracy of the model. Predicting accuracy using provenance data to improve model quality may be determined by feedback directly received by and explicitly provided by the users of the model and data, feedback received on derived datasets and models, a dataset that derives higher quality datasets and models and a dataset that derives a large number of datasets and models. A higher quality dataset may be determined by, for example, good reviews and ratings created by the users that indicate quality datasets.

According to an embodiment, the model quality program may utilize the various types of collected provenance data to build a provenance store for storage and analysis for users. A provenance store may include a database, a knowledge-base or a corpus that collects provenance data for analysis. The provenance store may store a large number of datasets on a database for a user to access when the user is training a model M on dataset D. Suggested datasets may be provided to a user based on similar domains or based on different domains that may execute the same task. For example, a user is training a sentiment analysis model on product reviews, therefore, a movie review dataset may be recommended to the user. The provenance data store may make recommended datasets available to a user to obtain new and useful features. A new and useful feature may include a training model to assist the user in finding potential home buyers that may be sent a housing loan offer. Additionally, a dataset containing the average income of the local residents may be helpful to the user.

A related dataset or multiple related datasets may be identified for a user. Related datasets may be identified, for example, by matching dataset descriptions, tags and categories. One challenge to identifying and selecting quality related datasets for a user may include a structured dataset that contains a large amount of data and a simple keyword-based search may not work or provide useful data. For example, a financial dataset may not include the term finance. Using a provenance-based approach of profiling all of the datasets, models and users based on provenance data captures the semantics of a user's requirements, datasets and models. Thus, resulting in highly effective user recommendations in the specified domain of a machine learning platform.

An analysis of provenance data assists in identifying related datasets that fit within a specified criterion. Dataset quality may be considered to be a high-quality dataset if the models were trained using accurate datasets, if the models have been deployed in production or if the performance during deployment has remained optimal with producing quality feedback. Indicators of quality datasets, quality performance and quality feedback may include accurate derived models, models deployed to production and consistent performance of a model after deployment over a time period. The user provided feedback for the dataset or for the model based on the indicators of quality datasets assist the model quality program in identifying the quality of datasets and the quality of models.

Provenance data may also be analyzed to improve model quality by recommending data transformations. Data transformation may include data cleaning. Data cleaning may detect and correct inaccurate records. The provenance store may collect information regarding transformations that have been applied on datasets for cleaning purposes before the dataset has been used to train a model since the operations performed on the dataset prior to model training provide information relating to how the dataset affects the training process. Provenance data may be searched, mined or analyzed to provide information that may be used to suggest a transformation that may be applied to a dataset. For each dataset, a category for each column and a record of the transformations applied to clean the columns may be identified. Example column categories may include a name, a date, a city or a company.

Once a dataset has been used to train a model, the classes of each column may be identified, and a model suggestion may include top-k transformations that apply to each column. The model suggestion relating to top-k transformations may include an instance when a dataset is used to train a model, then pre-processing operations may be checked for each column. For example, the text columns that were converted to a vector representation are checked again or the categorical columns that were encoded as integers are checked again. The transformations applied on one or more datasets may improve dataset ratings and may be used to train models to produce higher quality models.

According to an embodiment, improvements to model parameters and model metrics may be recommended based on an analysis of the provenance data. Model parameters may be determined by a user during the process of creating and training a model. ML algorithms and model parameters may be suggested to a user who would like to train model M using dataset D. For example, based on the provenance data of the user and the chosen dataset D, model parameters with similar algorithms and similar hyper-parameters are recommended to the user. Model parameters with similar algorithms and similar hyper-parameters may be based on past choices made by similar users in similar past setups and in similar domains. The recommendations may be extracted using the various collected provenance data.

Dataset D may be used to identify a distribution of classes and may be used to identify which dataset has a similar distribution of datasets that have derived quality models. For example, the values in the column that tracks age have a distribution from ages 18 to 80 years old with a Gaussian distribution having a parameter mean of 35.5 and a standard deviation of 8.2. Therefore, other datasets having the Gaussian distribution of age with similar parameters to that of the original dataset may be considered similar. Similar Gaussian distribution parameters and similar standard deviations may occur for one or more columns or all columns in the dataset. Quality may be a function of the performance parameters that are associated with the model when the model was trained. Quality may also be captured based on user feedback in the form of ratings and reviews. A model with positive reviews and higher average ratings may be considered to be a quality model.

The ML algorithm used to train the ML models may be recommended to the user for various domains and topics since ML algorithms may be learning the distribution boundaries. Given a schema (i.e., a set of columns) of a dataset, if the distribution of various columns is known, then many ML models may attempt to learn the boundaries across the distribution of the data that may determine the output class. For example, if two model specifications are applied on similar datasets containing a similar distribution, then there is a high likelihood that the model specifications are strongly related. Recommendations may be made based on the parameters of a related good quality model to improve the current model that the user is building. Recommendations of the related model may also be made.

For example, a user chooses to use a support vector machine (SVM) as the ML algorithm. Suppose many instances of SVM are used as a ML algorithm on datasets with similar distributions as dataset D. The provenance store may have data associated parameters, such as a Gaussian kernel parameter or a polynomial kernel parameter using a standard deviation, sigma.

Model quality may be diminished in the case of a limited amount of available data or a limited amount of datasets D to train a model M. A provenance store may learn the distribution of the limited datasets D and may find other datasets that have a similar class distribution as dataset D. The provenance store may recommend trained models using the other datasets that are most similar to dataset D. The other datasets may not be required to be in the same domain as dataset D. The user may obtain the recommended model and train the recommended model using dataset D since the recommended model may have previously learned a similar distribution. The recommended model may only be modified by using the limited dataset D.

According to an embodiment, provenance data may be analyzed to identify related models and to discover implicit relationships between different models. The analysis may include identifying useful information from the collected provenance data of multiple models and comparing the data to find best similar matches, for example, at a later point in time when a user is querying for related models or when the user is querying for implicit relationships between different models. Implicit relationships may include identifying information, such as two different models being used by a same algorithm or being trained on the same dataset. Current limitations in identifying related models may include a model catalog or a directory of ML models that find metadata-based relationships only. Provenance data may be utilized to identify and subsequently rank related models. As such, using provenance data with model metadata to discover implicit model relationships may allow other models to be identified that have similar names, similar description tags or other metadata.

A data catalog may contain a list of datasets and associated time static metadata, such as tags, descriptions and a list of columns. A model catalog or a model store may contain a list of models and the metadata associated with the models, such as tags, descriptions, training datasets and model parameters. The model catalog may also be time static metadata. The model catalog data may be distinguished from the provenance store such that the provenance store may contain both the static metadata and additional data that logs and stores dataset events. Dataset events may include dynamic data, such as transformational events that occurred over a dataset and real-time events occurring over a dataset.

According to an embodiment, a dataset event may include a dataset D1 that undergoes a transformation T to produce another dataset D2, then all of the details of the transformation are stored as a part of the provenance data. According to an embodiment, a dataset event may include storing the details relating to a ratings history or a feedback history on the dataset. According to an embodiment, a dataset event may include multiple versions of the dataset and the associated details relating to the changes that were made in each version of the dataset. According to an embodiment, a dataset event may include access patterns that relate to how and when a dataset has been downloaded and transmitted. The dataset event data may be considered to be a part of the provenance data.

Provenance data-based relationships may be analyzed to identify related models. For example, model 1 is generated using data assets A1 and A2 and utilizes features F1, ..., Fn. Model 2 is generated using data assets A3 and A4 and makes use of features F11, ..., Fnn. Data asset A3 is derived from A2 and the models M1 and M2 have some features in common. Therefore, a relationship exists between M1 and M2.

Context-based relationships may be analyzed to identify related models. For example, a user chooses a financial dataset containing information relating to bank customers and trains a model using the financial dataset. Similar datasets were chosen by many similar users in the past to train multiple good quality models. The quality models and model relationship parameters can be recommended to the user to assist the user in quickly attaining a good model by re-using any of the existing and recommended quality models or by recommending improvements to the user's current model.

Access patterns or usage-based relationships may also be analyzed to identify related models, such as by finding relationships based on a co-occurrence of access patterns. For example, when a housing loan model is accessed and in the same session, a user also accesses information relating to credit limit increases, the co-occurrence of access patterns is identified.

Data profile-based relationships may be analyzed to identify related models. An analysis of the profile of the data used to generate a model may include identifying similarities between the data profiles of the training data used across various models. Additionally, related models may be identified that have a similar profile of training data and that generate implicit relationships between the models.

One use case example may include a user that trains or accesses a model that solves a problem or allows accessibility to potential clients, such as determining which potential clients should be sent housing loan offers. A quality improvement recommendation may suggest relevant datasets, such as datasets that provide average income and lifestyle details of residents in a specified locality, a city or a residential complex. A quality improvement recommendation may also suggest data transformations, such as transforming the address using an address standardization model or by decomposing an address as a locality, a street or a residential complex. An additional quality improvement recommendation may provide a user with model metrics, such as suggesting an analysis of variance (ANOVA) kernel for a support vector machine (SVM) in a multi-dimensional regression problem that has been frequently used. A suggested related model may be provided to the user as a recommended model that may assist in solving the problem or allowing accessibility to potential clients, such as determining which potential clients should be sent offers for a credit limit increase. Various industries may use a model quality program, such as industries relating to finance, legal, business, government, medical, construction, transportation, agriculture, or entertainment.

Figure 1:
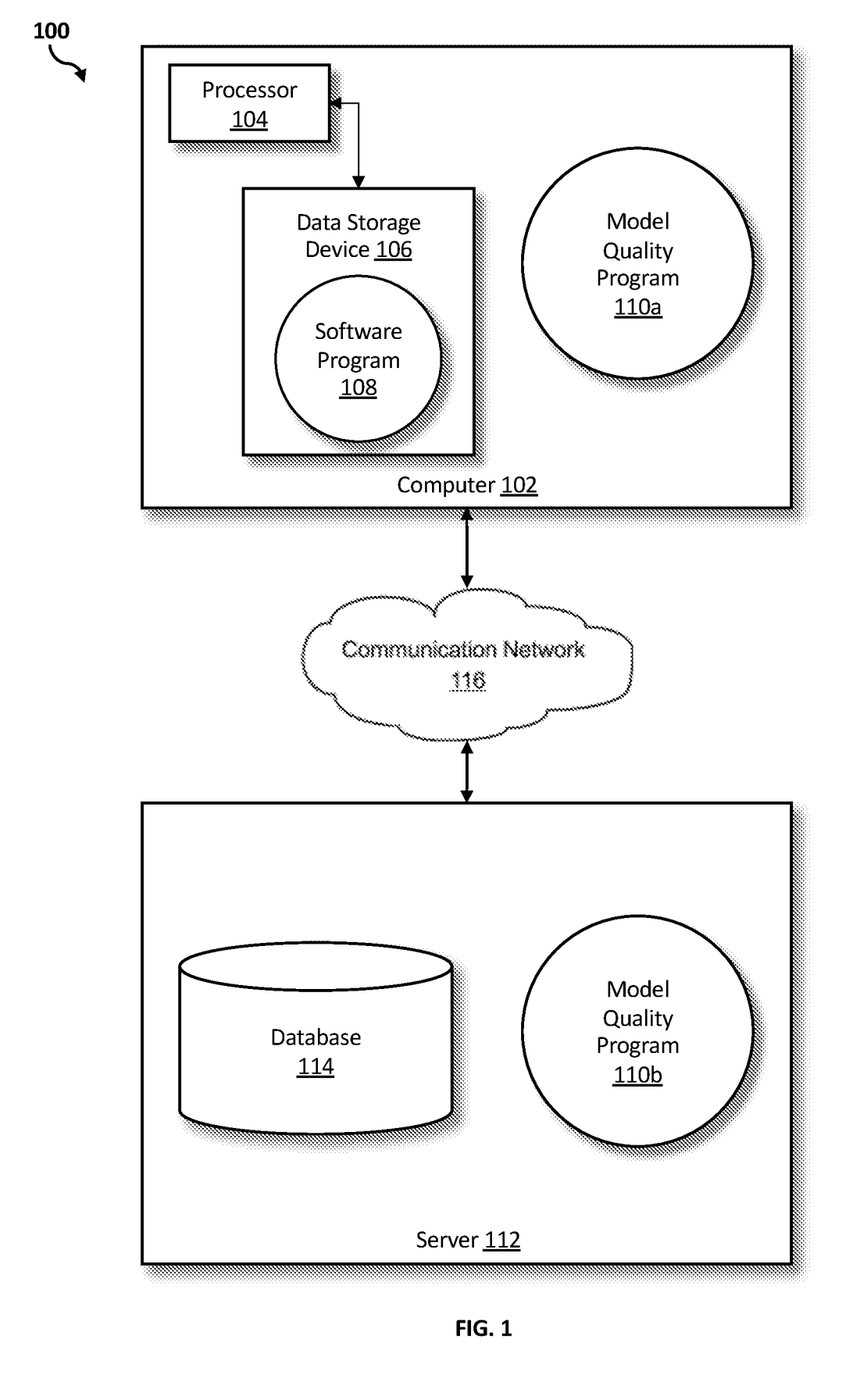
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a model quality program 110a. The networked computer environment 100 may also include a server 112 that is enabled to run a model quality program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the model quality program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the model quality program 110a, 110b (respectively) to identify model quality improvements and related models to recommend to a user. The model quality method is explained in more detail below with respect to FIGS. 2 and 3.

Figure 2:
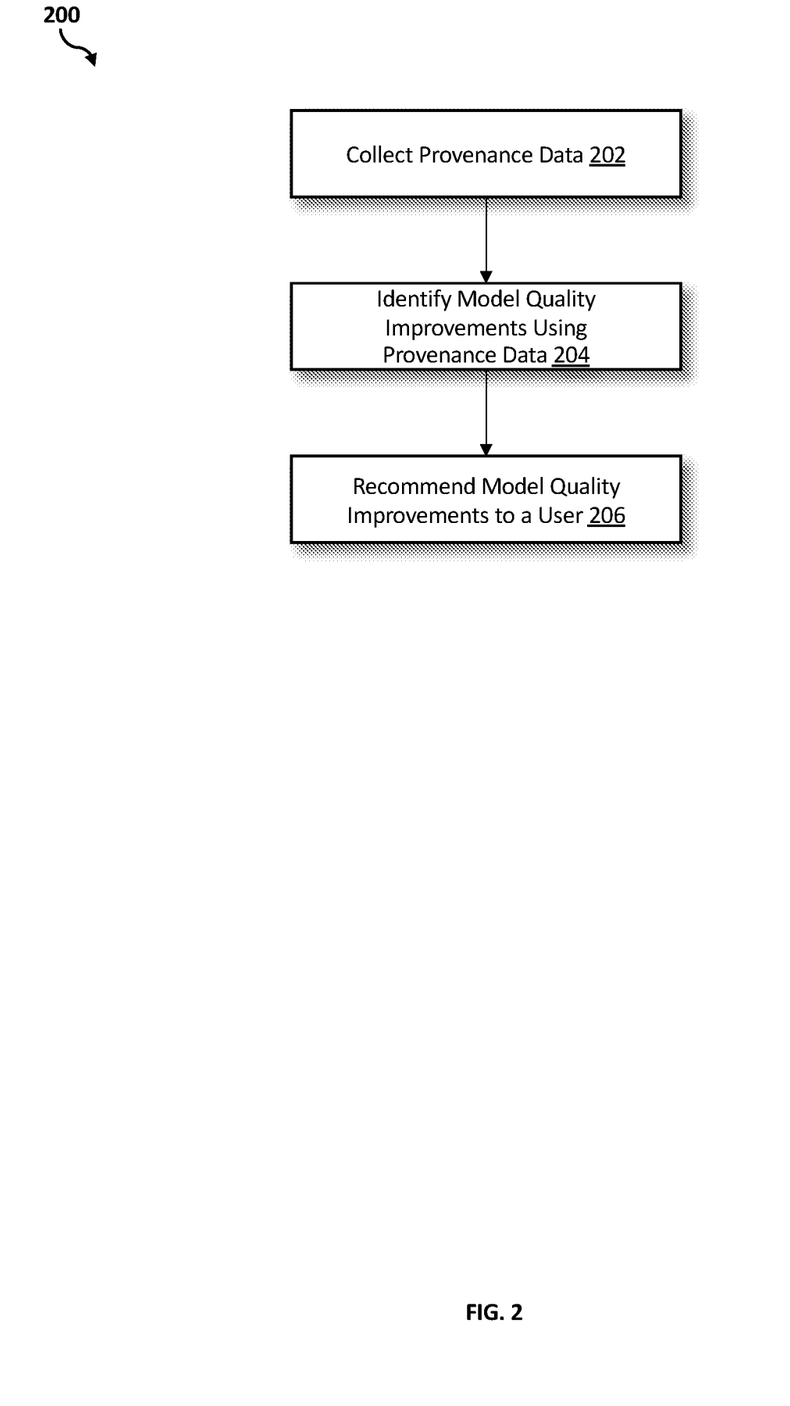
FIG. 2 is an operational flowchart illustrating a process for using provenance data to improve model quality recommendations to a user according to at least one embodiment.

Referring now to FIG. 2, an operational flowchart illustrating the exemplary model quality improvement process 200 used by the model quality program 110a, 110b according to at least one embodiment is depicted.

At 202, provenance data is collected. The provenance data may be collected on a computing device during a ML training phase, during times when a ML model is in use or after the ML model has been in operation. The provenance data collection may occur at varying iterations of the ML process. Provenance data may be collected and stored at a provenance store or on a database, corpus or knowledgebase. Provenance data may include both structured and unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content.

Provenance data may be stored on a public database or may be stored on a private database. For example, provenance data that contains publicly available data, such as names and addresses of individuals in a specified locality, may be stored on a public database. Provenance data stored on a private database may include data, for example, from a medical repository to train a model relating to medical images or medical diagnoses. Other private database examples may include images and documents from other industries, such as finance, legal, agriculture, automotive or governmental. Provenance data may be obtained based on accessibility.

At 204, model quality improvements are identified using provenance data. The analysis to identify model quality improvements include evaluating datasets, transformations of data and ML algorithms and parameters. Analyzing datasets to find optimal related datasets using the collected provenance data may include identifying matching dataset descriptions, tags and categories. Evaluating datasets may include identifying which candidate datasets have resulted in models approved of by a large number of users. For example, an identified dataset for a user includes a dataset that was identified as "liked" by many users in a public forum where "likes", feedback, ratings and reviews are provided.

Quality related datasets may be identified, for example, by a user working with a dataset containing a listing of customer data for Bank A related to sanctioned loans. The sanctioned loans information may be determined by metadata such as tags and categories. A similar dataset from Bank B has a larger number of customers and obtaining information relating to sanctioned loans for a larger dataset of customers would be useful. A matching dataset may be determined based on tags, categories, a distribution of data in various columns and a set of concepts associated with columns.

Analyzing data transformations using the collected provenance data may include evaluating the transformations that have been applied to a dataset, for example, for cleaning purposes. Datasets may contain discrepancies, such as outliers and formatting errors that may be removed using transformations such as filters and shaping functions. A shaping function may, for example, remove all of the leading, trailing and consecutive white spaces from the values. Cleaning the data using transformations is beneficial and may be necessary before using the data for training a model. Data transformations based on a dataset that has been used to train a model may be analyzed to identify classes of each column that may suggest top-k transformations that apply to each column. The transformations applied on one or more datasets may improve dataset ratings and may be used to train models to produce higher quality models. Data transformation analysis may assist in capturing or identifying which set of transformations benefit the given dataset based on the choices of the transformation functions made by the previous users in a similar scenario.

Analyzing ML algorithms and parameters using the collected provenance data may include evaluating the training model that was created by the user. The ML algorithm analysis assists in identifying quality models based on model performance that is evaluated after model training has been completed and based on user feedback in the form of ratings and reviews provided by users who have used the model.

At 206, the model quality improvements are recommended to a user. The recommendation may be provided to the user on a user computing device. The recommendation may be provided as an output transmitted to the user via an email message, a text message, a voice message, an alert or a pop-up message. The message may alert the user of by suggesting relevant datasets, such as a dataset that is related to or is beneficial to the content they are seeking. For example, a dataset that may be relevant to a model that was accessed by the user relating to housing loans may benefit from a relevant dataset relating to the average income in a particular locality. The message may also alert the user of suggested data transformations, such as transforming the data proposed in one dataset in a different way. For example, transforming data containing addresses as a standardized model may be done by transforming the address as written in plain unstructured text into structured columns of house number, street, locality, city, state, country and pincode. The message to the user may also suggest model metrics to use that improve the model quality, such as suggesting ANOVA kernel for SVM in a multi-dimensional regression problem.

Figure 3:
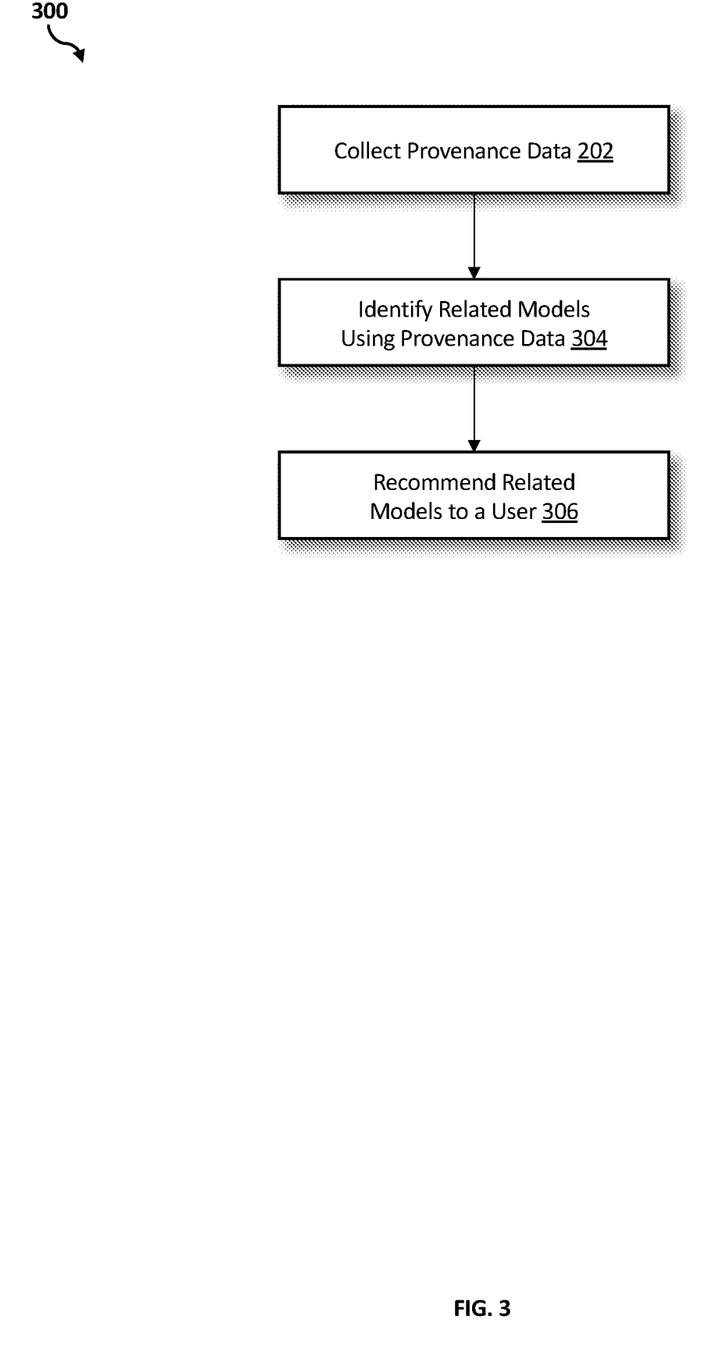
FIG. 3 is an operational flowchart illustrating a process for using provenance data to recommend related models to a user according to at least one embodiment.

Referring now to FIG. 3, an operational flowchart illustrating the exemplary related model identification process 300 used by the model quality program 110a, 110b according to at least one embodiment is depicted.

Refer to step 202 for the collection of provenance data.

At 304, related models are identified using provenance data. The related models may be identified by analyzing provenance data-based relationships, context-based relationships, access patterns or usage-based relationships and data profile-based relationships. Provenance data-based relationships may include more than one model being considered related if the models are derived from the same source. A context-based relationship may include more than one model being trained using similar datasets and a similar set of operations performed on the datasets before model training. The models may have been trained or may be trained by users that have similar profiles. The context may relate to part of the provenance data that was collected during a live session when the model was trained. Access patterns or usage-based relationships may include, for example, more than one model being accessed by a specific set of users repeatedly, such as a group of users working in the finance, legal, technology, governmental, agricultural, medical or industrial fields. For example, two models may be related based on access patterns made by users. Data profile-based relationships may include more than one different datasets having the same set of columns with a similar distribution of data in each column and having related tags.

At 306, the related models are recommended to a user. The recommendation may be provided to the user on a user computing device. The recommendation may be provided as an output transmitted to the user via an email message, a text message, a voice message, an alert or a pop-up message. The message may alert the user of another model related to the model they have accessed from the model catalog. For example, the accessed model is a model to search for customers that may be considered for a housing loan and the recommended related model may be suggested to the user that identifies customers that may be sent offers for credit limit increases.

It may be appreciated that FIGS. 2 and 3 provide only an illustration of some embodiments and do not imply any limitations with regard to how different embodiments may be implemented. Many modifications to the depicted embodiment(s) may be made based on design and implementation requirements.

Figure 4:
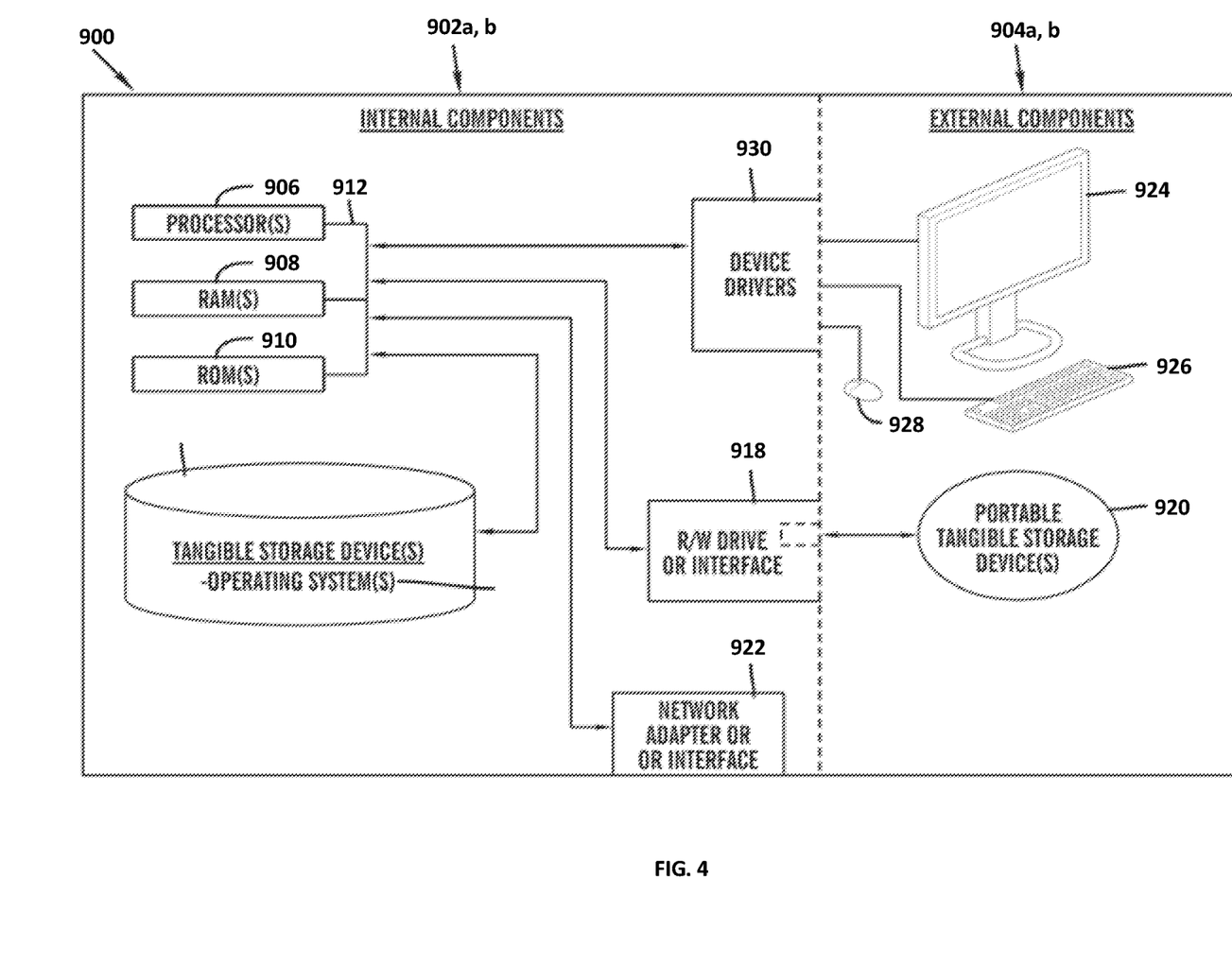
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the model quality program 110a in client computer 102, and the model quality program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the model quality program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the model quality program 110a in client computer 102 and the model quality program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the model quality program 110a in client computer 102 and the model quality program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
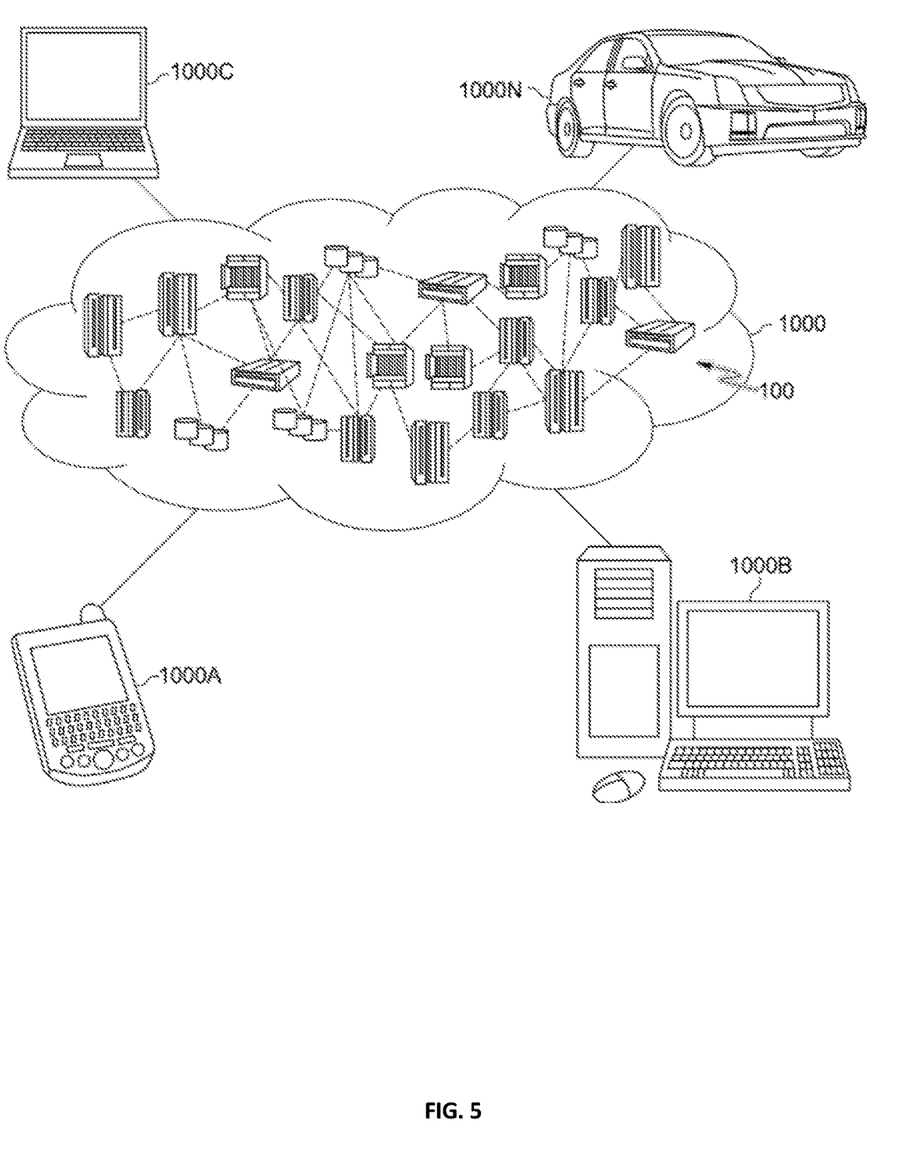
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
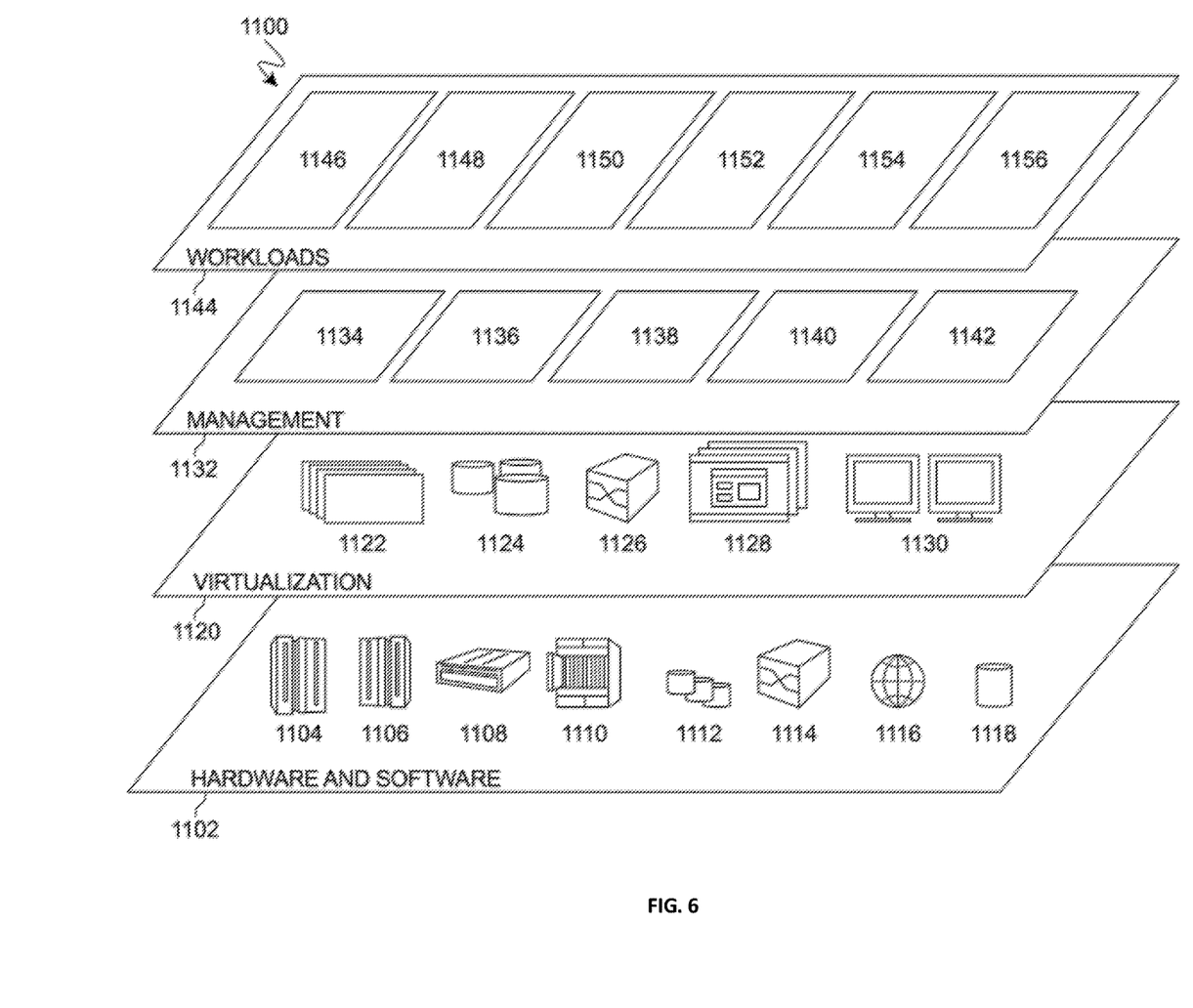
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and model quality improvement and related model recommendation analyses 1156. A model quality program 110a, 110b provides a way to recommend improved datasets to a user to create a quality ML model output or to use a different related model that may be optimal to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving machine learning, the method comprising:
    collecting, via a first computer, provenance data comprising at least one member selected from a group consisting of data origins and data movements;
    identifying, via the first computer, a first machine learning model, the provenance data relating to a first dataset that has been input to the first machine learning model, the first machine learning model having been trained by a first user;
    identifying, via the first computer, a second machine learning model having been trained by a second user, the identifying being based on the collected provenance data and based on a comparison of a user profile of the first user and a user profile of the second user;
    recommending, via the first computer and to the first user, a second dataset related to the first dataset, the second dataset being stored in a provenance store; and
    training, via the first computer, the identified second machine learning model by using the recommended second dataset.

2. The method of claim 1, wherein the provenance data is collected from the provenance store.

3. The method of claim 1, wherein the provenance data further comprises machine learning data that relates to the first machine learning model and that includes at least one member selected from a group consisting of: model metrics, training datasets, feature sets, a usage history, reviews, ratings, feedback, machine learning algorithms, model metadata, and deployment metadata.

4. The method of claim 1, wherein the provenance data relates to the first dataset and further includes at least one member selected from a group consisting of: a usage history, a forward lineage, a backward lineage, transformations applied for data preparation and data cleaning, column classifications, reviews, ratings, feedback, and a data distribution.

5. The method of claim 1, further comprising identifying model quality improvements for the first machine learning model based on the collected provenance data, wherein the identifying the model quality improvements includes analyzing at least one member selected from a group consisting of:
    datasets,
    transformations of data,
    machine learning algorithms, and
    parameters.

6. The method of claim 1, wherein the identifying the second machine learning model further includes analyzing at least one member selected from a group consisting of provenance data-based relationships, context-based relationships, usage-based relationships, and data profile-based relationships.

7. The method of claim 1, wherein the second dataset was used to execute a same task as the first dataset.

8. The method of claim 1, wherein the identifying the second machine learning model further comprises identifying that the first dataset was also used to train the second machine learning model.

9. The method of claim 1, wherein the second machine learning model is identified from a machine learning model catalog, and the second machine learning model was listed in the machine learning model catalog before the first machine learning model is identified.

10. A computer system for improving machine learning, the computer system comprising:
    one or more processors, one or more computer-readable memories, one or more computer readable storage mediums, and program instructions stored on at least one of the one or more computer readable storage mediums for execution by at least one of the one or more processors via at least one of the one or more computer-readable memories, wherein the computer system is configured to perform a method comprising:
    collecting provenance data comprising at least one member selected from a group consisting of data origins and data movements;
    identifying a first machine learning model, the provenance data relating to a first dataset that has been input to the first machine learning model, the first machine learning model having been trained by a first user;
    identifying a second machine learning model having been trained by a second user, the identifying being based on the collected provenance data and based on a comparison of a user profile of the first user and a user profile of the second user;
    recommending, to the first user, a second dataset related to the first dataset, the second dataset being stored in a provenance store; and
    training the identified second machine learning model by using the recommended second dataset.

11. The computer system of claim 10, wherein the provenance data is collected from the provenance store.

12. The computer system of claim 10, wherein the provenance data further comprises machine learning data that relates to the first machine learning model and that includes at least one member selected from a group consisting of:

model metrics, training datasets, feature sets, a usage history, reviews, ratings, feedback, machine learning algorithms, model metadata, and deployment metadata.

13. The computer system of claim 10, wherein the provenance data relates to the first dataset and further includes at least one member selected from a group consisting of: a usage history, a forward lineage, a backward lineage, transformations applied for data preparation and data cleaning, column classifications, reviews, ratings, feedback, and a data distribution.

14. The computer system of claim 10, wherein the method further comprises identifying model quality improvements for the first machine learning model based on the collected provenance data, and wherein the identifying the model quality improvements further includes analyzing at least one member selected from a group consisting of:
  datasets,
  transformations of data,
  machine learning algorithms, and
  parameters.

15. The computer system of claim 10, wherein the identifying the second machine learning model further includes analyzing at least one member selected from a group consisting of provenance data-based relationships, context-based relationships, usage-based relationships, and data profile-based relationships.

16. A computer program product for improving machine learning, the computer program product comprising:
  one or more computer readable storage mediums and program instructions stored on at least one of the one or more computer readable storage mediums, the program instructions being executable by a processor to cause the processor to perform a method comprising:
  collecting provenance data comprising at least one member selected from a group consisting of data origins and data movements;
  identifying a first machine learning model, the provenance data relating to a first dataset that has been input to the first machine learning model, the first machine learning model having been trained by a first user;
  identifying a second machine learning model having been trained by a second user, the identifying being based on the collected provenance data and based on a comparison of a user profile of the first user and a user profile of the second user;
  recommending to the first user a second dataset related to the first dataset, the second dataset being stored in a provenance store; and
  training the identified second machine learning model by using the recommended second dataset.

17. The computer program product of claim 16, wherein the provenance data further comprises machine learning data that relates to the first machine learning model and that includes at least one member selected from a group consisting of: model metrics, training datasets, feature sets, a usage history, reviews, ratings, feedback, machine learning algorithms, model metadata, and deployment metadata.

18. The computer program product of claim 16, wherein the provenance data relates to the first dataset and further includes at least one member selected from a group consisting of: a usage history, a forward lineage, a backward lineage, transformations applied for data preparation and data cleaning, column classifications, reviews, ratings, feedback, and a data distribution.

19. The computer program product of claim 16, wherein the method further comprises identifying model quality improvements for the first machine learning model based on the collected provenance data, and wherein the identifying the model quality improvements further includes analyzing at least one member selected from a group consisting of:
  datasets,
  transformations of data,
  machine learning algorithms, and
  parameters.

* * * * *